H. W. LASH, H. AIKEN & D. E. PARK.
OPEN HEARTH FURNACE.
No. 10,984. Reissued Feb. 5, 1889.
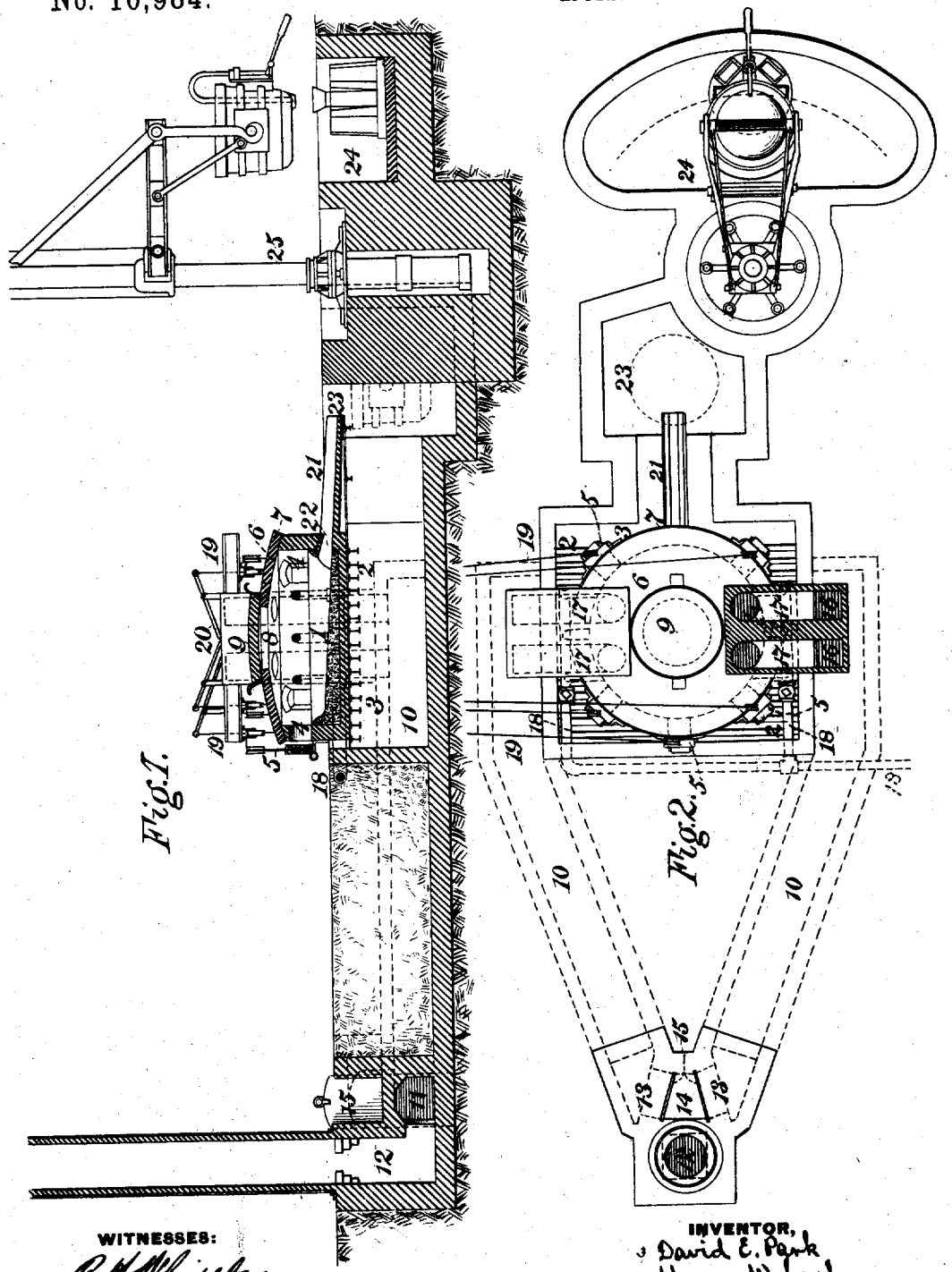
WITNESSES:
R. H. Whittlesey
F. E. Gaither
INVENTOR,
3 David E. Park
1 Horace W. Lash
2 Henry Aiken
by Darwin S. Wolcott Att'y.

UNITED STATES PATENT OFFICE.

HORACE W. LASH, OF PITTSBURG, HENRY AIKEN, OF HOMESTEAD, AND DAVID E. PARK, OF PITTSBURG, PENNSYLVANIA.

OPEN-HEARTH FURNACE.

SPECIFICATION forming part of Reissued Letters Patent No. 10,984, dated February 5, 1889.

Original No. 365,936, dated July 5, 1887. Application for reissue filed August 6, 1888. Serial No. 282,107.

*To all whom it may concern:*

Be it known that we, HORACE W. LASH, residing at Pittsburg, in the county of Allegheny and State of Pennsylvania, HENRY AIKEN, formerly of Pittsburg, but now residing at Homestead, in the county of Allegheny and State of Pennsylvania, and DAVID E. PARK, residing at Pittsburg, in the county of Allegheny and State of Pennsylvania, citizens of the United States, have invented or discovered certain new and useful Improvements in Open-Hearth Furnaces, of which improvements the following is a specification.

In the accompanying drawings, which make part of this specification, Figure 1 is a sectional elevation of our improved furnace and plant for the production and casting of open-hearth steel. Fig. 2 is a top plan view of the same.

In building furnaces for the production of open-hearth steel it is usually customary to arrange the regenerative chambers for heating the gas and air on the ground-level, and on these chambers as a foundation or support the melting hearth and chamber is built. The flues for conducting the air and gas to the melting-chamber are arranged alongside thereof, the walls forming such flues forming part of the outer shell or wall of the melting chamber and hearth. The brick walls between the flues and melting-chamber become highly heated, and consequently are rapidly burned out, allowing the molten steel to escape in the regenerative chambers; and this defect also exists in those furnaces where a slight air-space is left between the chamber and the flues, as such air-space does not extend for the full height of the melting-chamber. Another defect incident to the usual arrangement of the open-hearth furnace arises from the height of the regenerative chambers and the consequent necessity of lifting the metal charge to the charging-floor—usually a height of ten or twelve feet—and the lowering of the molten metal to the ingot-pit. A still further objectionable feature of this construction is the fact that the furnace can be charged from one side only, unless a movable platform is employed—an expedient seldom resorted to, as such platform would interfere with the movements of the ladle.

The object of our invention is to so arrange and construct a furnace of the class described as to permit of easy and ready access on all sides for the purpose of charging and repair; to so arrange the air-flues as to entirely isolate the melting-chamber and hearth therefrom, except at such points where the flues enter the chamber; to permit of a full and free circulation of air around and under the melting-chamber and hearth, thereby avoiding an excessive heating of the walls of the chamber and hearth, and consequently preventing the rapid burning out of such walls; to obviate the hoisting of the materials charged into the furnace; to permit of the easy discharge of the molten metal into the ladle and its casting into ingots, and, finally, to avoid the use of stays and braces in the construction of the furnace.

To these ends our invention consists in the construction and combination substantially as hereinafter more fully described and claimed.

The shell of the hearth 1 is supported on a series of I-beams, 2, which are supported at their ends by the side walls of the pit 3, sunk a considerable distance below the level of the ground, as shown in Fig. 1. The beams are arranged at such a distance below the ground-level as to bring the charging-openings 4 of the hearth a convenient charging distance above the ground-level. The pit 3 is rectangular in shape, and is made of such size in proportion to the diameter of the hearth as to leave a considerable air-space between the walls of the pit and the shell of the hearth. The hearth of melting-chamber is formed by a shell consisting of a series of plates riveted together, lined with fire-brick, as shown in Fig. 2, and through the sides of the shell are formed a series of openings, through which the material can be charged into the hearth. These openings, which are closed by sliding doors 5, can be located at any point around the furnace, except in line with the air-flues, and in any desired number, thereby greatly increasing the facility in charging the furnace. The cover or top 6 of the hearth is composed of fire-brick so arranged within a retaining ring or band, 7, as to form a concavo-convex plate or disk resting at its edge on the vertical wall of the hearth with its convex side upward. As the brick-work composing the cover or top 6 is keyed or wedged within the retaining-band, the cover can be built on the ground away from the hearth, and then can be lifted by a suitable crane into place on the hearth and removed therefrom, if desired. By making the cover detachable it is possible to have an extra cover in readiness to be placed in position whenever the cover in use is destroyed or broken down, thus avoiding the delay now necessary to permit the hearth cooling off before a new roof can be built, and in case it is necessary to repair the hearth itself the cover can be removed, thereby facilitating the cooling down of the hearth, and also permitting ready access to the damaged parts. In the center of the cover 6 is formed an opening, 8, of larger capacity than the openings 4 in the side of the hearth for the admission of large pieces of metal which cannot be broken up sufficiently small to pass through the openings 4. Over the opening 8 is placed the cover 9, provided with suitable hooks, whereby it may be lifted. On opposite sides of the pit 3 are built the horizontal flues 10, which, extending some distance underground beyond the pit, converge to a common chamber, 11, said chamber opening into the stack 12. These flues 10 are enlarged vertically at their ends adjacent to the chamber 12, forming chambers 13, their contiguous sides opening into what may be termed the "air-pit" 14. Over the openings of the flues and the chamber 13 into the chamber 11 and air-pit 14 are arranged the vertically-movable valve-plates 15, which are made of such a size as to cover only one of the openings at the same time—as, for example, when the plates 15 are raised, so as to close the openings from the chamber 13 into the air-pit, the openings from the flues into the common chamber 11 will be unobstructed.

From the furnace ends of the flues 10 extend two or more vertical flues, 16, which, passing along the sides of the hearth or melting-chamber, but at a distance therefrom, are connected at their upper ends to the melting-chamber by the horizontal flues 17, which enter the melting-chamber through suitable openings in the top or cover 6. Through the wall of the hearth below the flues 17 are formed openings for the admission of gas, which is supplied through a system of pipes, 18, from any suitable source. The doors 5 in front of the openings 4 in the hearth are connected by chains or wire ropes 19, passing around suitably-arranged guide-pulleys to the operating-levers 20, pivoted on posts secured on a platform or pulpit located at one side of the furnace. A trough or conductor, 21, is arranged between the tap-hole 22 and the ladle-pit 23, located a short distance from the pit 3, and a suitable distance from the ladle-pit is located the ingot or casting pit 24. Between the ladle and casting pits is placed a hydraulic ladle-crane, 25, having a jib of such a sweep as to permit of the ladle being moved from the ladle-pit to and over the ingot-molds without moving the ladle in or out along the jib.

In operating our improved furnace gas is admitted into the furnace through the system of pipes 18, and the valve-plates are so adjusted by raising one and lowering the other as to open communication between one of the flues 10 and the stack through the chamber 11 and close the opening of that flue and the air-pit; but the other flue is cut off from the stack, but is in communication with the air-pit through its vertical extension 13. While the valve-plates are in the position stated air will enter the flue in communication with the air-pit, and, passing along such flue, will enter the hearth just above the gas-inlets, and combining with the gas will increase and accelerate the combustion of the latter. The products of combustion will escape through the flue in communication with the stack, and in their passage through such flue will highly heat the walls thereof. As soon as the walls of the flue in communication with the stack are highly heated throughout their entire length, by which time the walls of the other will be cooled down by the air passing therethrough, the position of the valve-plates 15 is reversed, so that the air will enter the hearth through the flue previously heated by the products of combustion, which will now escape through the opposite flue and heat its walls. The air as it passes along the heated flues will be raised to a high temperature, and in entering the hearth will flow down upon the burning gas, thereby effecting a more perfect commingling therewith. It is important that the air should enter the hearth above the gas, as the latter, on account of its low specific gravity, rises rapidly, and this arrangement, in addition to effecting thorough mixture of the air and gas, will also produce a downward deflection of the burning gas onto the metal on the hearth, thus avoiding the necessity of curving the cover downward, as is now the usual practice.

The metal is charged into the hearth through the openings 4, arranged around the furnace at such distances apart as to enable a gang of men to work at each opening without interference with each other, thus providing for a more rapid charging than is possible in other forms of furnace. As soon as the metal has been properly treated, the tap-hole is opened and the molten metal flows along the conductor 21 into the ladle depending from the jib of the crane 25. As soon as all the metal has been run into the ladle, the latter is raised and swung over the ingot-molds arranged in the pit 24. It will be understood that the gas is reversed, as is customary, at the same time that the air is reversed.

It will be observed that all hoisting of the material to be charged is avoided in the above construction of furnace, and that the material for the next charge can be placed in convenient position for charging onto the hearth while one charge is being treated in the furnace. This preparation for charging is impracticable in the usual construction of open-hearth furnaces, on account of the necessarily-contracted area of charging-floor; nor can the old form of furnace be charged from more than one side, and then through only two or three doors at the most.

Another prominent characteristic of our furnace is the possibility of changing the hearth itself without the necessity of tearing down all of the air and gas flues at the sides. When the hearth of our furnace needs renewal or repair, it is only necessary to remove a portion of the horizontal flues 17, when the whole hearth can be lifted from its supporting-beams and another hearth placed in position. In case of the burning through of the shell of the hearth, the escaping metal will run down into the pit 3 without causing any further injury to any other part of the furnace; but in the usual form of furnace the metal escaping from the hearth will run down into the checker-work in the regenerative chambers, thereby clogging them and rendering them useless. If desired, a sand pig-bed may be made in the bottom of the pit 3, thereby providing for molding of any escaping steel into convenient form for subsequent use. There is little liability, however, of the hearth being burned through, as it is entirely detached except where the air-flues enter from other parts of the furnace, and the air having ready access to all parts will rapidly carry off the radiant heat.

Another important feature of our invention is the accessibility of the tapping-hole and ladle from the ground, thus avoiding the necessity of swinging platforms and stages from which to reach either the tapping-hole of the hearth or the stopper operating mechanism of the ladle. The hearth may be circular or slightly oval, as circumstances or the nature of the work to be performed may dictate.

This furnace is applicable not only to the production of steel, but may be used as a heating-furnace or for any other metallurgical purpose.

We are aware that a Siemens open-hearth furnace has been constructed with its charging-doors accessible from the ground-level, its tapping-hole at or near the ground-level, and its regenerators underneath the hearth, and therefore make no claim to such construction.

We claim herein as our invention—

1. An open-hearth furnace having its charging-doors accessible from the ground-level, in combination with underground flues leading from opposite sides of the furnace downward clear of the walls of the same and converging to a common stack, substantially as set forth.

2. An open-hearth furnace having an underlying pit, 3, suitably proportioned to the diameter of the hearth to provide an open air-space which extends beneath the hearth and up its sides, and having its charging-doors accessible from the ground-level, in combination with underground flues leading from opposite sides of the furnace and converging to a common stack, substantially as set forth.

3. The combination of an open-hearth furnace circular in form and having its tapping-hole at or near the ground-level, a ladle-pit located in convenient proximity to the tapping-hole, a casting-pit located in convenient proximity to the ladle-pit, and a crane located between the ladle and casting pits, substantially as set forth.

4. An open-hearth furnace, in combination with an underlying pit, 3, proportioned to the diameter of the hearth to provide an open air-space which extends beneath the hearth and up its sides, underground flues located on opposite sides of the hearth and converging to a common stack, air-inlets connecting with the flues, and valves arranged to connect the flues alternately with the stack and with the air-inlets, substantially as set forth.

In testimony whereof we have hereunto set our hands.

HORACE W. LASH.
HENRY AIKEN.
DAVID E. PARK.

Witnesses for Lash and Aiken:
DARWIN S. WOLCOTT,
R. H. WHITTLESEY.
Witnesses for Park:
JOHN NEELY,
GEO. WRIGHT, JR.